J. A. ANGLADA.
VEHICLE WHEEL RIM.
APPLICATION FILED JUNE 1, 1910.
1,095,772.
Patented May 5, 1914.
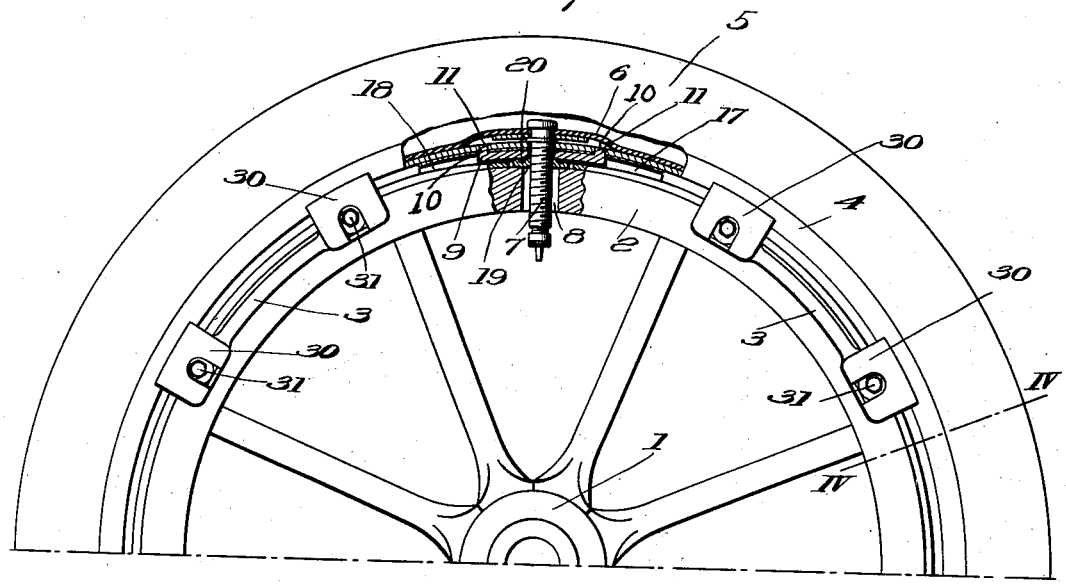
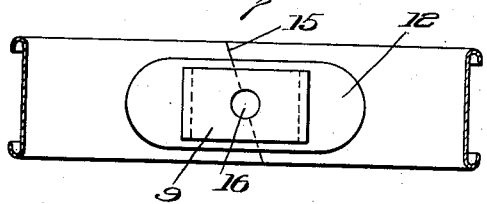
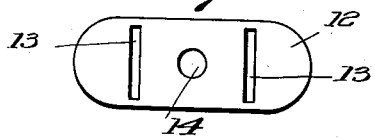
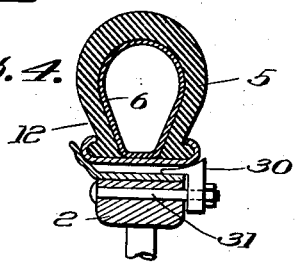
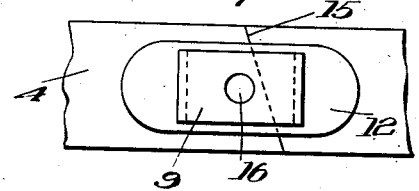
Witnesses:
Oliver Williams
Gerald E. Terwilliger.
Joseph A. Anglada Inventor
By his Attorney
Seward Davis

UNITED STATES PATENT OFFICE

JOSEPH A. ANGLADA, OF NEW YORK, N. Y., ASSIGNOR, BY MESNE ASSIGNMENTS, TO UNIVERSAL RIM COMPANY, OF CHICAGO, ILLINOIS, A CORPORATION OF ILLINOIS.

VEHICLE WHEEL-RIM.

1,095,772.  Specification of Letters Patent.  Patented May 5, 1914.

Application filed June 1, 1910. Serial No. 564,355.

*To all whom it may concern:*

Be it known that I, JOSEPH A. ANGLADA, a citizen of the United States, residing in the city, county, and State of New York, have invented certain new and useful Improvements in Vehicle Wheel-Rims, of which the following is a specification.

My invention relates to vehicle wheel rims for use with pneumatic or other resilient tires and is primarily adapted for service with pneumatic tires of the clencher or Dunlop type commonly used on automobiles. My rim is of the general class known as demountable, and of the type in which the metal rim carrying the tire is transversely split, means being provided for separably attaching the rim to the wheel felly. Novel means are provided for uniting the ends of the rim when in service, whereby dust is excluded from the tire and the uniting means itself utilized for preventing the creeping of the tire on the felly.

In the accompanying drawings which form a part of this specification, Figure 1 is an elevation of a part of a vehicle wheel with my device in place, parts being broken away to show in section the construction of the means for locking the ends of the rim together; Fig. 2 is a view of the inner periphery of the split rim with the tire removed, looking outwardly; Fig. 3 is a plan of the dust-plate for preventing the entrance of dust or moisture into the tire at the point where the rim is split; Fig. 4 is a section on line IV—IV of Fig. 1; Fig. 5 is a view similar to Fig. 2, illustrating a modification in which the rim is split at one side of the hole through which the valve stem of the tire passes; Fig. 6 is a side elevation of the structure shown in Fig. 5.

Referring to the drawings in detail, the numeral 1 designates the vehicle wheel having a felly 2 carrying rim fastening means 3 for clamping the split rim 4 rigidly to the felly. The split rim 4 carries the tire 5 in which is the tube 6, the valve stem 7, which passes through an opening 8 in the felly being provided for admitting air to the tube 6. For uniting the ends of the split rim 4, I provide the bridge member or plate 9, which has upstanding flanges or projections 10 entering the holes or sockets 11 formed in the split rim, and transversely elongated as shown by full and dotted lines in Figs. 2 and 5. Between the split rim and the bridge member is placed the dust-plate 12, which has openings 13 through which pass the upstanding flanges 10 of the bridge member, and the opening 14, through which the valve stem may pass. The rim 4 is split transversely along the line 15 and is preferably split obliquely, as shown. This split may be so disposed as to pass through the valve stem hole 16 in the rim, as illustrated in Fig. 2, or may pass to one side of the valve stem hole, as shown in Fig. 5. I prefer the latter form for the reason that should the rim creep transversely or its ends otherwise get out of alinement in service there will be no danger of shearing off the valve stem, as would otherwise be the case. The bridge member 9 is designed to engage the two driving plates 17 and 18 rigidly attached to the felly, and thus performs the dual function of uniting the ends of the split rim as well as taking the driving strain and preventing the creeping of the rim on the felly. Engaging the externally threaded portion of the valve stem 7 is the washer 19 having the insert 20 of leather, rubber or other substantially waterproof and compressible material. When this washer is screwed home against the bridge member it retains the latter in position, and through the coöperation of the washer, the bridge member and the dust-plate, the entrance of dirt or moisture into the tire at the point where the rim is split is effectually prevented.

Any suitable means may be used for securing the rim upon the felly, the means shown comprising a series of locking wedges 30 secured to the felly by bolts 31. The forcing in of the wedges exerts an expansive force upon the rim which prevents the same from collapsing while in operation, the bridge member 9 with its integral flanges or projections effectually locking the ends of the split rim together and preventing them from spreading.

In the operation of my device the split rim carrying the tire is first removed from the felly by the removal of the rim fastening means. The washer 20 is then unscrewed from the valve stem, after which the bridge member 9 may be removed. The split rim may then be contracted in diameter, the beads of the tire slipped from under the retaining flanges of the rim, and the tire and tube readily removed from the rim. As the split rim is contracted when having the tire applied to or removed from it, it may be used with tires with inextensible as well as with extensible beads.

In the accompanying drawings I have illustrated two specific modifications of my invention, but it will be apparent that my invention is susceptible of wider application, and I do not wish to be limited to the forms shown and described in detail.

Having described my invention, I claim:

1. In a vehicle wheel, in combination, a transversely split tire carrying rim having sockets on either side of the split in said rim, and means detachable from said rim for uniting the ends of said rim, comprising a segmental bridge member having projections adapted to enter said sockets.

2. In a vehicle wheel, in combination, a transversely split tire-carrying rim having sockets on either side of the split in said rim, means for uniting the ends of said rim comprising a bridge member having projections adapted to enter said sockets, and means for excluding foreign substances from said rim at the point where it is split, including a plate having apertures therethrough for the reception of said projections, said plate being adapted to be clamped to the rim by the bridge member.

3. In combination, in a vehicle wheel, a transversely split tire carrying rim, means for uniting the ends of said rim, a tire carried by said rim, and a plate clamped to said rim by said uniting means for excluding foreign substances from said tire at the point where the rim is split.

4. In combination in a vehicle wheel, a transversely split tire-carrying rim, means for uniting the ends of said rim, a tire carried by said rim, and a plate detachably interposed between said uniting means and rim for excluding foreign substances from said tire at the point where the rim is split.

5. In combination, in a vehicle wheel, a felly, a transversely split tire carrying rim, means for detachably securing said rim to said wheel, a tire carried by said rim having a valve stem extending through said rim, means for uniting the ends of said rim, and means for excluding foreign substances from said tire at the point where the rim is split, said means including a washer surrounding said valve stem bearing against said uniting means, and a plate clamped against said rim by said uniting means.

6. A transversely split tire-carrying demountable rim having holes in its ends adjacent to its split, in combination with a split-bridging, rim-end-locking, driving member, detachable from the rim to permit separation of its ends, and comprising a plate on the inner periphery of the rim and having outstanding projections fitting respective holes in said rim ends.

7. A transversely split tire-carrying demountable rim having rectangular holes in its ends adjacent to its split, in combination with a split-bridging, rim-end-uniting-and-alining member, detachable from the rim to permit separation of its ends and comprising a curved plate on the inner periphery of the rim and having rectangular outstanding projections fitting respective holes in said rim ends.

8. A transversely split tire-carrying demountable rim having transversely elongated holes in its ends adjacent to its split, in combination with a split-bridging, rim-end-uniting-and-alining, driving member, detachable from the rim to permit separation of its ends and comprising a curved plate on the inner periphery of the rim and having outstanding projections fitting said holes in respective rim ends and correspondingly elongated.

9. A transversely split tire-carrying demountable rim having holes in its ends adjacent to its split, in combination with a split-bridging, rim-end-uniting-and-alining, curved plate detachably held on the inner periphery of the rim and having outstanding projections fitting respective holes in said rim ends and said plate and one said rim-end containing a valve stem hole.

10. A vehicle wheel having spaced driving plates and rim-clamping means on its felly, in combination with a transversely split tire-carrying demountable rim having holes in its ends adjacent its split, and a split-bridging, rim-end-uniting member detachable from the rim to permit separation of its ends and comprising a curved plate fitting between said spaced driving plates and having outstanding projections fitting respective holes in said rim ends.

JOSEPH A. ANGLADA.

Witnesses:
GERALD E. TERWILLIGER,
OLIVER WILLIAMS.

DISCLAIMER.

1,095,772.—*Joseph A. Anglada*, New York, N. Y. VEHICLE WHEEL-RIM. Patent dated May 5, 1914. Disclaimer filed May 16, 1914, by the assignee, *Universal Rim Company*.

"Enters this disclaimer in said specification, which is in the following words, to wit:

"1. In a vehicle wheel, in combination, a transversely split tire carrying rim having sockets on either side of the split in said rim, and means detachable from said rim for uniting the ends of said rim, comprising a segmental bridge member having projections adapted to enter said sockets."

[*Official Gazette, May 26, 1914.*]